United States Patent Office 3,711,551
Patented Jan. 16, 1973

3,711,551
PROCESS OF PRODUCING ORTHO-AMINOPHENOL
Matthew A. McMahon, Wappingers Falls, N.Y., assignor to Texaco Inc., New York, N.Y.
No Drawing. Filed July 15, 1970, Ser. No. 55,263
Int. Cl. C07c 91/44
U.S. Cl. 260—575                6 Claims

ABSTRACT OF THE DISCLOSURE

A method of manufacturing o-aminophenol comprising contacting under anhydrous conditions phenylhydroxylamine with trifluoroacetic anhydride at a first temperature between about −50 and 150° C. and then at a second temperature between about 70 and 150° C. to form a mixture of N-trifluoroacetyl-o-hydroxyaniline and O-trifluoroacetyl-o-hydroxyaniline and contacting said mixture with a hydroxylic base to form said o-aminophenol.

BACKGROUND OF INVENTION

Ortho-aminophenols have been found to be useful as dispersant materials in drilling muds. As o-aminophenol gains widespread acceptance as a drilling mud additive, large quantity production will be required. Present processes for manufacturing o-aminophenol leave much to be desired in the area of cost, and therefore, there is a distinct need for developing new, efficient and less costly means of manufacturing the aminophenol.

SUMMARY OF INVENTION

I have discovered, and this constitutes my invention, a novel and economic means of manufacturing o-aminophenol comprising contacting N-phenylhydroxylamine with trifluoroacetic anhydride under anhydrous conditions at a first stage temperature between about −50 and 150° C. and then at a second stage temperature between about 70 and 150° C. to form a mixture of N-trifluoroacetyl-o-hydroxyaniline and O-trifluoroacetyl-o-hydroxyaniline and subsequently as a third stage contacting the mixture with an aqueous solution hydroxylic base.

DETAILED DESCRIPTION OF THE INVENTION

In detail, the method comprises contacting under anhydrous conditions phenylhydroxylamine with trifluoroacetic anhydride in an inert liquid solvent medium at a first temperature of between about −50 and 150° C. utilizing a phenylhydroxylamine to anhydride mole ratio of between about 1:1 to 1:10 and subsequently continuing said contacting at a second temperature between about 70 and 150° C. to form a mixture of O-trifluoroacetyl-o-hydroxyaniline and N-trifluoroacetyl-o-hydroxyaniline. The formed hydroxyanilines may be recovered by standard means and then contacted with a 1 to 25 wt. percent aqueous solution of a hydroxylic base at a temperature between about 0 to 100° C. utilizing a mole ratio of hydroxylic base to hydroxyaniline of between about 1:100 and 1:1 and recovering formed o-aminophenol from the resultant reaction mixture via standard means.

The O-trifluoroacetyl-o-hydroxyaniline and N-trifluoroacetyl-o-hydroxyaniline may be respectively characterized by the following structural formulas:

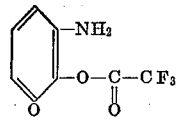   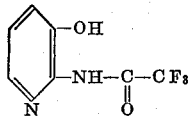

In one embodiment of the invention the first temperature is maintained in a range of between about −50 and +70° C. and N-trifluoroacetyl-N-phenylhydroxylamine intermediate is formed. The N-trifluoroacetyl-N-phenylhydroxylamine intermediate undergoes rearrangement to the O-trifluoroacetyl-o-hydroxyaniline and N-trifluoroacetyl-o-hydroxyaniline mixture which is then subsequently converted to the o-aminophenol. When the first temperature is above about 70° C. the N-trifluoroacetyl-N-phenylhydroxylamine is essentially a transistory intermediate. The advantage of this embodiment wherein the first temperature is maintained below about 70° C. is that the overall process is easier to control.

The N-trifluoroacetyl-N-phenylhydroxylamine may be characterized by the following structural formula:

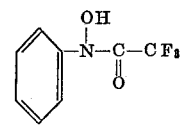

It is to be noted that within the scope of the contemplated method there is contemplated the situation where the first and second temperatures are essentially the same when the first temperature is in the 70–150° C. range.

Under most preferred conditions contacting at said first and second temperature is conducted in an inert atmosphere, e.g., nitrogen.

Recovery, if desired, of the N-trifluoroacetyl-N-phenylhydroxylamine intermediate from the reaction mixture of the first phase when the first temperature is below about 70° C. is accomplished by standard means such as washing the reaction mixture with water followed by treating the water washed residue with a weak aqueous alkali such as between about 1 and 10 wt. percent aqueous sodium bicarbonate solution, drying the solution over a desiccant such as anhydrous calcium chloride and removing solvent by fractional distillation followed by recrystallization, e.g. from benzene and petroleum ether.

In respect to the recovery of the N-trifluoroacetyl-o-hydroxyaniline and O-trifluoroacetyl-o-hydroxyaniline intermediate mixture, standard means may also be employed such as cooling the reaction mixture until the organic layer crystallizes, recovering the crystallized product and recrystallizing from suitable solvent material such as benzene.

In respect to the o-aminophenol final product recovery, this may be accomplished by recovering the product precipitate and recrystallizing in a suitable solvent such as benzene followed by successive recrystallization until desired purity is obtained.

In respect to the material aspects of the reaction, one of the important factors in the method of the invention is the maintenance of the second temperature above about 70° C., since rearrangement of the temperatures below about 70° C. does not occur to a significant degree. Another important factor is trifluoroacetic anhydride (normally derived from excess employed during first temperature contacting) must be present during both said first and second temperature (at temperatures below about 130° C.) contacting for a measurable yield of the mixture intermediate and final o-aminophenol product. It is to be noted trifluoroacetic anhydride is not necessary for the rearrangement to occur during the second temperature contacting if the second temperature is above about 130° C.

Still another material aspect in the method is that the solvent employed therein be inert and capable of solubilizing the reactants otherwise the desired intermediates and final product are not formed. The inert solvent is advantageously present in an amount of between about 50 and 99 wt. percent basis the reaction mixture and of a melting and boiling point which permits it to essentially remain in the liquid state during the particular phase of the reaction which it is to function. Suitable examples of solvent are tetrahydrofuran, ether, chlorobenzene, toluene, nitrobenzene, Decalin, dimethylformamide and dodecane.

Suitable examples of water soluble hydroxylic bases contemplated herein are sodium hydroxide and potassium hydroxide.

The following examples further illustrate the method of the invention but are not to be construed as limitations thereof.

EXAMPLE I

This example illustrates the first stage of the reaction when the first temperature is below about 70° C. and also the production of N-trifluoroacetyl - N - phenylhydroxylamine intermediate.

About 20 grams (0.18 mole) of phenylhydroxylamine were dissolved in 400 mls. of anhydrous ether and cooled to −20° C. Then 50 grams (0.24 mole) of trifluoroacetic anhydride were added to the solution over a 20 minute period. The mixture was held at −20° C. for 40 minutes and then was allowed to warm to room temperature. The ether solution was washed with water (2× 150 mls.) and then with a 5 wt. percent aqueous solution of sodium bicarbonate (4× 75 mls.). After the solution had been dried over anhydrous calcium chloride the solvent was removed by means of a rotary evaporator. Thirty-four grams of solid remained. This was recrystallized several times from a benzene-petroleum ether solvent combination. The recrystallized product weighed 15.6 grams and had a melting point of 79–84° C. It was determined to be N-trifluoroacetyl-N-phenylhydroxylamine in a yield of 42 wt. percent basis N-phenylhydroxylamine charge.

EXAMPLE II

The example illustrates the second stage of the reaction, namely, the rearrangement of the N-trifluoroacetyl-N-phenylhydroxylamine first stage intermediate of Example I into the second stage O-trifluoroacetyl-o-hydroxyaniline and N-trifluoroacetyl-o-hydroxyaniline mixture.

The charge materials were as follows:

Charge:                                                   Run A
   N-trifluoroacetyl-N-phenylhydroxylamine, g.     1
   Chlorobenzene, mls.                       25

The N-trifluoroacetyl-N-phenylhydroxylamine was dissolved in the chlorobenzene and heated at 130° C. for 4 hours. Removal of the solvent after the time left 0.7 gram (70% yield) of the crude rearranged product basis N-trifluoroacetyl-N-phenylhydroxylamine charged.

EXAMPLE III

This example illustrates the combined first-second stage where both the first and second temperatures are above about 70° C.

To a solution of 5 grams (0.045 mole) of phenylhydroxylamine in 50 mls. of dry tetrahydrofuran there was added a solution of 36 grams (0.18 mole) of trifluoroacetic anhydride in 40 mls. of tetrahydrofuran. The temperature rose 10° C. during the addition period. The solution was then heated at reflux (70° C.) for 3 hours. The reaction mixture was cooled and poured slowly into 200 mls. of ice water. Upon standing for two days crystals formed in the organic layer which when collected and purified, weighed 4.9 grams (52 mole percent yield) and melted at 165–168° C. These crystals were identified as a mixture of O-trifluoroacetyl-o-hydroxyaniline and N-trifluoroacetyl-o-hydroxyaniline.

EXAMPLE IV

This example further illustrates the combining of the first and second stages of the method of the invention wherein the first hydroxylamine intermediate is transitorily formed and rearranged in situ to the hydroxyaniline intermediate mixture.

About 5 grams (0.045 mole) of N-phenylhydroxylamine were dissolved in 50 mls. of tetrahydrofuran. Trifluoroacetic anhydride (18.4 grams, 0.09 mole) was added to this solution. This caused temperature to increase to 33° C. The mixture was then heated at reflux (74° C.) for 3 hours. The reaction mixture was cooled and poured into 200 mls. of ice water. The layers were separated and the organic layer was washed with 100 mls. of water. The organic layer solidified. It was dissolved in ether, transferred to a beaker and the ether was evaporated. Benzene was then added to the residue. The light brown crystals (1.7 grams, M.P. 145–165° C.) were collected. A second crop (1.1 grams, M.P. 145–162° C.) was obtained from the filtrate. The two crops were recrystallized again from benzene giving light brown flakes (1.6 grams which melted at 166–170° C.). Recrystallization of this product gave flakes which melted at 167° C. The product was identified as a mixture of O-trifluoroacetyl-o-hydroxyaniline and N-trifluoroacetyl-o-hydroxyaniline in a yield of 29 wt. percent basis N-phenylhydroxylamine reactant.

EXAMPLE V

This example illustrates the third stage of the reaction, namely, the conversion of the hydroxyaniline mixture intermediate to the desired o-aminophenol.

About 400 mgs. (1.9 millimoles) of the product of Example II was added to 5 mls. of water containing 80 milligrams (2 millimoles) of sodium hydroxide. While the solution was being stirred at room temperature for 15 minutes, a brown precipitate appeared. It weighed 0.133 gram and melted at 176–178° C. and was found to have an infrared spectrum identical to that of o-aminophenol. It was identified as o-aminophenol corresponding to 62 wt. percent yield basis the hydroxyaniline mixture intermediate charge.

EXAMPLE VI

This example illustrates the importance of employing solvent as defined.

The materials and conditions employed were as follows:

| Run | B | C |
| --- | --- | --- |
| Charge: | | |
|   Methylcyclohexane, mls. | 50 | 50 |
|   N-phenylhydroxylamine, g. | 0.5 | 0.5 |
|   Trifluoroacetic anhydride, g. | 3.5 | 4 |
| Conditions: | | |
|   Temperature, ° C. | 30 | −25 |
|   Time, hrs. | 1 | 2 |

In the procedure utilizing the foregoing charge and conditions, a solution of the anhydride dissolved in the methylcyclohexane was added to a mixture of the other two materials in both Runs B and C. The hydroxylamine does not dissolve in the methylcyclohexane. Both of the reaction mixtures became black and tars formed. Work-up of Run B reaction mixture indicated that dyes had formed. Aqueous solutions of these dyes turned colors as the pH of the solution was changed. No indications of the hydroxylamine and hydroxyaniline intermediates were found.

EXAMPLE VII

This example illustrates the need for employing trifluoroacetic anhydride at reaction temperatures below about 130° C. in the second stage of the method.

A solution of 0.5 gram of N-trifluoroacetyl-N-phenylhydroxylamine, 1 gram of trifluoroacetic acid and 50 mls. of anhydrous ether was held at 35° C. for 3 hours. The reaction mixture was then washed with water and once with 5 wt. percent aqueous solution of sodium bicarbonate. After the organic layer had been dried over calcium chloride, it was filtered and the ether was removed on a rotary evaporator. The residue weighing 0.7 gram melted at 74–77° C. and its infrared spectrum matched that of the starting hydroxylamine.

EXAMPLE VIII

This example further illustrates the importance of employing trifluoroacetic anhydride in the second stage of the method at reaction temperatures below about 130° C.

The procedure of Example II was essentially repeated with the exception that (1) acetic anhydride was substituted for trifluoroacetic anhydride, (2) the reaction mixture of phenylhydroxylamine and acetic anhydride were dissolved in pyridine, and (3) the resultant mixture was heated to a temperature of 118° C. The product was tar and remained unidentifiable. Upon work-up an unidentifiable black oil was obtained and it was found it was not in a form of an acetate derivative of the phenylhydroxylamine reactant of any type.

I claim:
1. A method of preparing o-aminophenol consisting essentially of the following:
   (a) first contacting under anhydrous conditions phenylhydroxylamine and trifluoroacetic anhydride in the presence of an inert liquid solvent for said hydroxylamine and said trifluoroacetic anhydride at a first temperature of between —50 and 150° C. utilizing a mole ratio of said phenylhydroxylamine to said trifluoroacetic anhydride of between about 1:1 and 1:10, subsequently continuing said first contacting at a second temperature between 70 and 150° C. in the continued presence of said trifluoroacetic anhydride when said second temperature is below 130° C., recovering from the reaction a mixture of O-trifluoroacetyl-o-hydroxyaniline and N-trifluoroacetyl-o-hydroxyaniline,
   (b) second contacting said mixture with between 1.0 and 25 wt. percent of an aqueous solution of an inorganic hydroxylic base at a third temperature between 0 and 100° C. utilizing a mole ratio of said base to said mixture of between 1:100 and 1:1 and recovering o-aminophenol from the resultant reaction products.

2. A method in accordance with claim 1 wherein said first temperature is between —50 and 70° C., at the end of said first contacting at said first temperature recovering the formed N-trifluoroacetyl-N-phenylhydroxylamine in said first contacting and subsequently rearranging said N-trifluoroacetyl-N-phenylhydroxylamine to said mixture during first contacting at said second temperature.

3. A method in accordance with claim 1 wherein said solvent is tetrahydrofuran and said hydroxylic base is sodium hydroxide.

4. A method in accordance with claim 2 wherein said second temperature is between 130° C. and 150° C.

5. A method in accordance with claim 4 wherein said first contacting at said second temperature is conducted in the absence of trifluoroacetic anhydride.

6. A method in accordance with claim 5 wherein said solvent in said first contacting at said first temperature is diethyl ether and said solvent in said first contacting at said second temperature is chlorobenzene.

References Cited

Brewster and McEwen: Organic Chemistry, 3rd ed., Prentice-Hall, Inc., Englewood Cliffs, N.J., 1961, p. 284.

Sidgwick's Organic Chemistry of Nitrogen, 3rd ed., Clarendon Press, Oxford, 1966, pp. 176–178.

LEWIS GOTTS, Primary Examiner

C. F. WARREN, Assistant Examiner

U.S. Cl. X.R.

260—518 A, 561 HL